Dec. 22, 1959 R. L. VAN ANTWERP 2,918,288

RECORD CHANGERS FOR PHONOGRAPHS

Filed April 10, 1953 3 Sheets-Sheet 1

INVENTOR.

Robert L. Van Antwerp

By: Fred Gerlach his Atty.

RECORD CHANGERS FOR PHONOGRAPHS

Filed April 10, 1953

3 Sheets-Sheet 2

INVENTOR.

Robert L. Van Antwerp

By: Fred Gerlach his Atty.

INVENTOR.
Robert L. Van Antwerp
By Fred Gerlach
his atty.

United States Patent Office 2,918,288

Patented Dec. 22, 1959

2,918,288

RECORD CHANGERS FOR PHONOGRAPHS

Robert L. Van Antwerp, Sodus, Mich., assignor to V-M Corporation, Benton Harbor, Mich., a corporation of Michigan

Application April 10, 1953, Serial No. 347,864

1 Claim. (Cl. 274—10)

The present invention relates to phonograph record playing mechanisms of the type commonly known as automatic record changers and which include a motor-driven turntable, a tone arm including a pick-up device having an operating stylus for engaging a record groove, and record handling instrumentalities associated with the tone arm and coordinated therewith automatically to reproduce recordings on flat rotary disk records in predetermined sequence.

The invention is specifically concerned with a composite mechanical adapted by means of which a record having an oversize center hole is adapted for play upon a phonograph which is equipped with a conventional, non-rotating spindle of relatively small diameter. According to the present invention, the mechanical adapter is fitted upon the pilot at the top of the standard spindle and the drop type record release mechanism associated with the spindle is adapted to coact with and actuate the drop type mechanism associated with the mechanical adapter to release records having oversize holes, one at a time, to playing position upon the rotating turntable.

Another object of the invention is to provide an adapter or auxiliary spindle of this type which is simple in construction and efficient in operation, and which is an improvement upon, and has certain inherent advantages over, that which is disclosed in, and forms the subject matter of my co-pending United States patent application, Serial No. 347,863, filed on April 10, 1953 and entitled "Record Changers for Phonographs."

Other objects will appear from the detailed description.

The invention consists in the several novel features which are hereinafter set forth and are more particularly defined by the claim at the conclusion hereof.

Figures 1, 2, 3, 4:
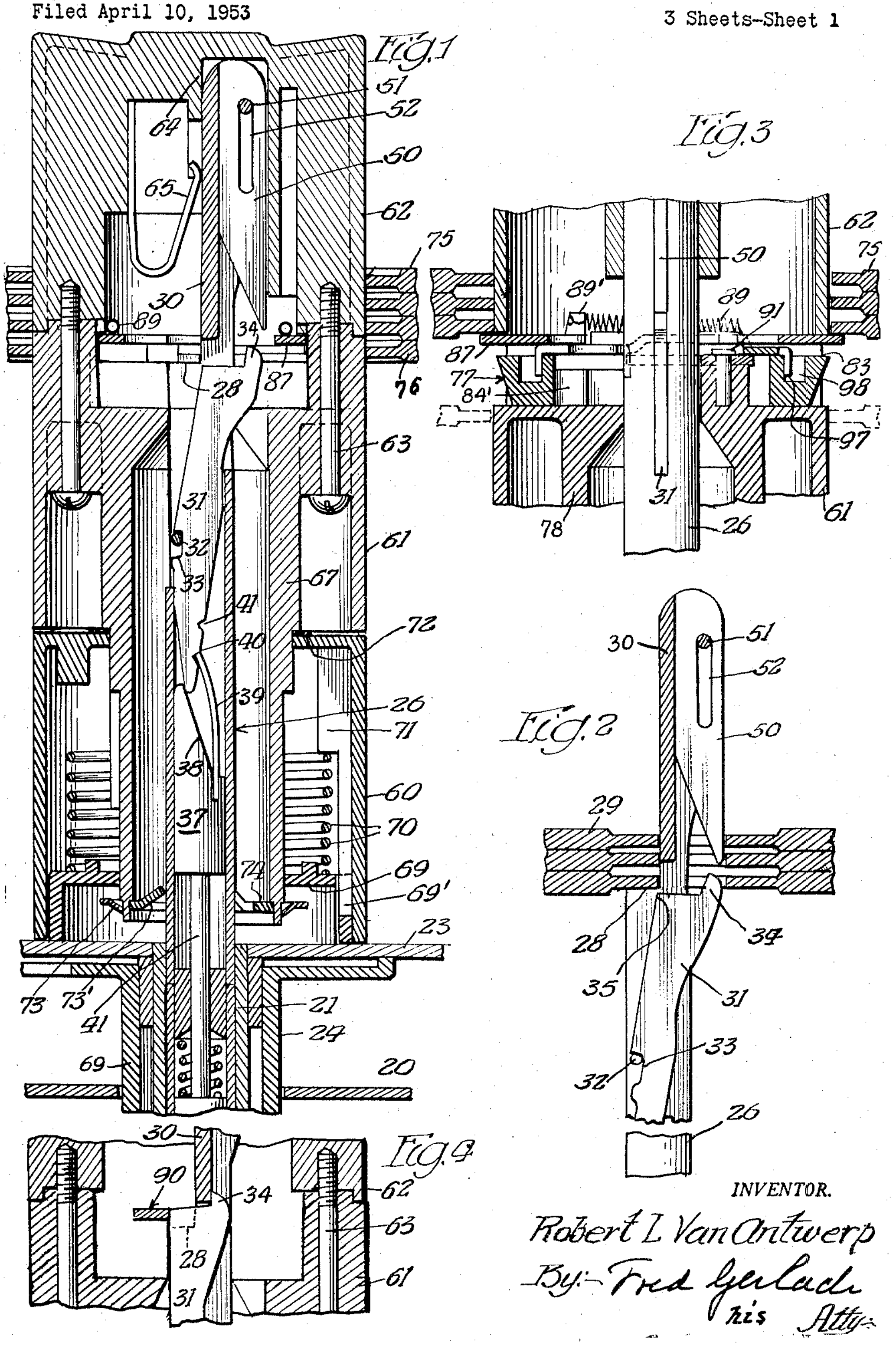
Fig. 1 is a vertical sectional view of a portion of a phonograph equipped with the invention, the outer spindle or adapter being applied to the inner spindle, for changing records having large spindle openings.
Fig. 2 is a vertical sectional view of the inner spindle and a stack of records having small spindle openings supported thereon.
Fig. 3 is a partial sectional view taken on line 3—3 of Fig. 7.
Fig. 4 is a partial sectional view similar to Fig. 1, the record-changing device on the inner spindle being illustrated as operating the record-changing device on the outer spindle.

The invention is exemplified in a phonograph which comprises a suitable supporting base 20, a stationary sleeve 21 supported on said base, a turntable 23 for the records, and a sleeve 24 fixed to the turntable and suitably journalled on a bearing on the base. The turntable may be driven by any suitable driving mechanism. A hollow spindle 26 for records having small center holes is fixedly supported on the base and has its lower end fixedly secured in the upper end of sleeve 21 which is fixedly supported on the base 20. The spindle 26 fits in a stack of records which have small center holes and has an offset upper extension 30 and an offset shoulder 28 at the lower end of extension for supporting the stack of said records 29.

The record-changing mechanism for records on the spindle 26 comprises a lever 31 which is pivotally and longitudinally movable in the spindle and is adapted to displace the lowermost record from the offset shoulder 28 so it will drop along spindle 26 onto the turntable while the remainder of the stack will be supported on said spindle. Lever 31 is pivotally supported and vertically slidable on a pin 32 which extends across a notch 33 in lever 31 and is fixed in spindle 26. An abutment 34 projects from one side of the upper end of lever 31 and extends into one side of the hole in the lowermost record for normally holding it on the offset 28. A shoulder 35 on the opposite side of the upper end of lever 31 is adapted, when it is lifted into the hole in the lowermost record and is pivotally shifted, to displace the lowermost record of the stack from offset 28 so it will drop onto the turntable for reproduction. A plunger 37 is slidably mounted in hollow spindle 26 and is provided with a cam 38 for engaging the lower end of lever 31 and a leaf spring 39 for vertically shifting said lever. The upper end of strip 39 is adapted to engage notches 40 and 41 in lever 31 for moving said lever upward during the initial portion of an up stroke of plunger and downward during initial portion of its downstroke, while permitting cam 38 to swing the upper end of lever laterally to displace the lowermost record when the lever is pivotally shifted after it has been raised. Plunger 37 is operated by a stem 41 which is actuated by any suitable automatic control device for the record changer, for example as exemplified in my copending application, above referred to. A bar 50 is slidably mounted in the offset portion 30 of spindle 26 by a pin 51 and slot 52 to retain and guide the record next above the lowermost record onto the offset shoulder 28.

The operation of the record changer for records with small center holes on spindle 26 will be as follows:

The lowermost record 29 of the stack will rest on offset 28 and support the stack above the turntable, in alignment with the offset portion 30 of the spindle. The abutment 34 on lever 31 will hold the lowermost record 29 on the offset 28. The superposed records 29 will be concentric with the offset portion 30 of the spindle and the record immediately above the lowermost record will be held against lateral movement by the bar 50. When the playing of the record on the turntable has been completed, lever 31 will be operated by the automatic control mechanism for the record changer which will lift stem 44, plunger 37, and spring 39 in the spindle 26. Initially, resilient spring 39, engaging notch 40, will slide lever 31 upwardly within the limits of notch 33. During this upward sliding movement of lever 31, its abutment 34 will be raised into the hole in the lowermost record 29 until lever 31 is arrested by the lower end of notch 33 which engages pin 32. The continued upward movement of plunger 37 will force strip 39 to snap out of notch 40 and cam 38 will swing lever 31 on pin 32 and cause abutment 34 to engage the inner periphery of the hole in the lowermost record and displace said record from the offset 28 so that it will drop along spindle 26 onto the turntable or records previously deposited thereon for a record-change. The succeeding record 29 will drop onto the upper end of lever 31 adjacent abutment 34. During the lowering of stem 44, plunger 37 through spring 39 will lower lever 31 to lower the remainder of the stack of records until the lowermost record is supported on offset 28 and the lever 31 is restored to its normal position in the spindle 26.

The arrangement of parts thus far described is more or less conventional and exemplifies a record changer for records having small size center openings. The composite adapter of the present invention is adapted operatively to be applied to the pilot extension 30 by telescopic reception thereover in a manner that will be set forth presently and, when so applied, will automatically become effective to sequentially drop records with oversize center holes onto the turntable.

The present invention is in the form of an adapter or outer spindle which is applied over and fits around the upstanding spindle 26 for records having small center holes, and is provided with a record-changing mechanism which is operable and controlled by the record-changing means on the inner spindle 26, so that no change is necessary in said inner spindle for actuating the record-changing mechanism on the outer spindle.

The outer spindle for the records with large openings includes a lower section 60 which is adapted to rotate with the turntable 23, an intermediate stationary section 61, and a stationary top or cap section 62. Sections 61 and 62 are secured together in abutting relation by screws 63. The cap section 62 is provided with a socket 64 which fits the upper end of the offset portion 30 of spindle 26 for stationarily and demountably supporting the outer spindle and parts supported thereby on the inner spindle and over the turntable. The sections of the outer spindle may be formed of suitable substantially rigid plastic material. The periphery of the sections fits in the large holes with which some records are provided.

For demountably securing the outer spindle on the spindle 26, a spring 65 is secured in the cap section and frictionally grips the offset portion 30 of spindle 26.

A sleeve 67, integral with section 61, extends downwardly into the section 60 of the outer spindle. A ring 69 in the lower end of section 60 is adapted to bear on the turntable 23, and a coil spring 70 extends between said ring and a series of vertical internal ribs 71 formed on the section 60 is adapted to urge ring 69 against the top of the turntable 23. One of the ribs 71 extends into a slot in ring 69 for rotating section 60 with the turntable. An antifriction washer 72 is placed between the top wall of section 60 and the lower end of section 61.

A collar 73 is secured on the lower end of sleeve 67 for limiting the movement of ring 69 by spring 70 when the adapter is removed from the spindle 26. When the outer spindle is applied to the spindle 26, ring 69 will frictionally engage the turntable and, through ribs 71, rotate section 60 while the sections 61 and 62 remain stationary. Inclined lugs 73' on collar 73 guide the stem 26 into the outer spindle and hold the lower end of the outer spindle concentric with the inner spindle.

The mechanism of the adapter for changing records with large spindle openings on the outer spindle comprises a pair of oppositely disposed slidably retractable supports or detents 77 (Figs. 3 and 5 to 8 inclusive) which have side-portions slidably fitting between upstanding guide lugs 78 formed on the top wall 79 of the spindle-section 61. Each detent 77 has an upwardly facing horizontal shoulder 83 which normally projects outwardly of the periphery of the outer spindle for supporting a stack of records and is slidable inwardly on the top wall 79 of spindle section 61 to release the lowermost record of the stack. Arms 84 on each detent 77 are pressed apart by compression springs 85 which extend into sockets in the confronting ends of arms 84 for urging said detents into their extended or operative position against limit stops or posts 84' formed on the lugs 78.

A pair of oppositely disposed blades 87 are slidable in guideways 86 and their outer ends are adapted to pass between the two lowermost records on the spindle to support the stack of records above the lowermost record when the detents 77 are retracted and subsequently to release the bottom record of such stack and deposit the same on the detents 77 when the latter are in their advanced positions as will be described presently.

Coil springs 89 are each connected to a tongue 89' on one of the blades 87 and are anchored in a hole in the other of said blades for normally holding the operative ends of said blades retracted in the spindle section 61 and for retracting said blades when the detents 77 are returned to their opeartive position. Blades 87 temporarily support the superposed records while the lowermost record is released by detents 77 and until the latter are again in position to support the stack.

Mechanism for actuating the blades 87 and detents 77 on the outer spindle is operable by the lever 31 of the record-changing device on the inner spindle 26. This mechanism is carried by the outer spindle and comprises a lever 90 (Figs. 4 to 8 inclusive) which is pivotally supported on a pin 91 on the top wall 79 of the outer spindle section 61. Lever 90 includes an arm 92 adapted to abut against and shift a depending tongue 93 on one of the blades 87 and an arm 94 adapted to abut against and shift a depending tongue 95 on the other blade 87. These arms shift the blades in opposite directions against the force of springs 89 to move the operative ends of blades 87 between the two lowermost records to support the superposed records. Each blade 87 is also provided with a depending tongue 97 (Fig. 3) which extends into a socket 98 in one of the detents 77 for retracting the latter inwardly into the section 61. Arms 92 and 94 on lever 90 shift the blades 87 outwardly and oppositely against the force of springs 89. The depending tongues 97 serve during inward movement of the blades 87 to cause outward movement of the detents 77 for a purpose that will be set forth subsequently. Lever 90 further includes an arm 99 which normally engages a stop 100 on the top wall of section 61 and is shiftable and controlled by the lever 31 responsively to the control device for the changer on the inner spindle. When lever 31 is raised in spindle 26, it will pass into position to engage arm 99 of lever 90 and, when lever 31 is pivotally shifted to the position shown in Fig. 4, it will rock lever 90 and operate arms 92 and 94 to shift blades 87 and their tongues 97 for shifting the blades 87 outwardly into operative position and retracting the detents 77. When lever 31 in the inner spindle 26 is restored to its normal position, blades 87 will be retracted by springs 89 and will retract lever 90 against stop 100, and depending tongues 97 will release detents 77 so they will be spread apart by springs 85.

Figures 5, 6, 7, 8:
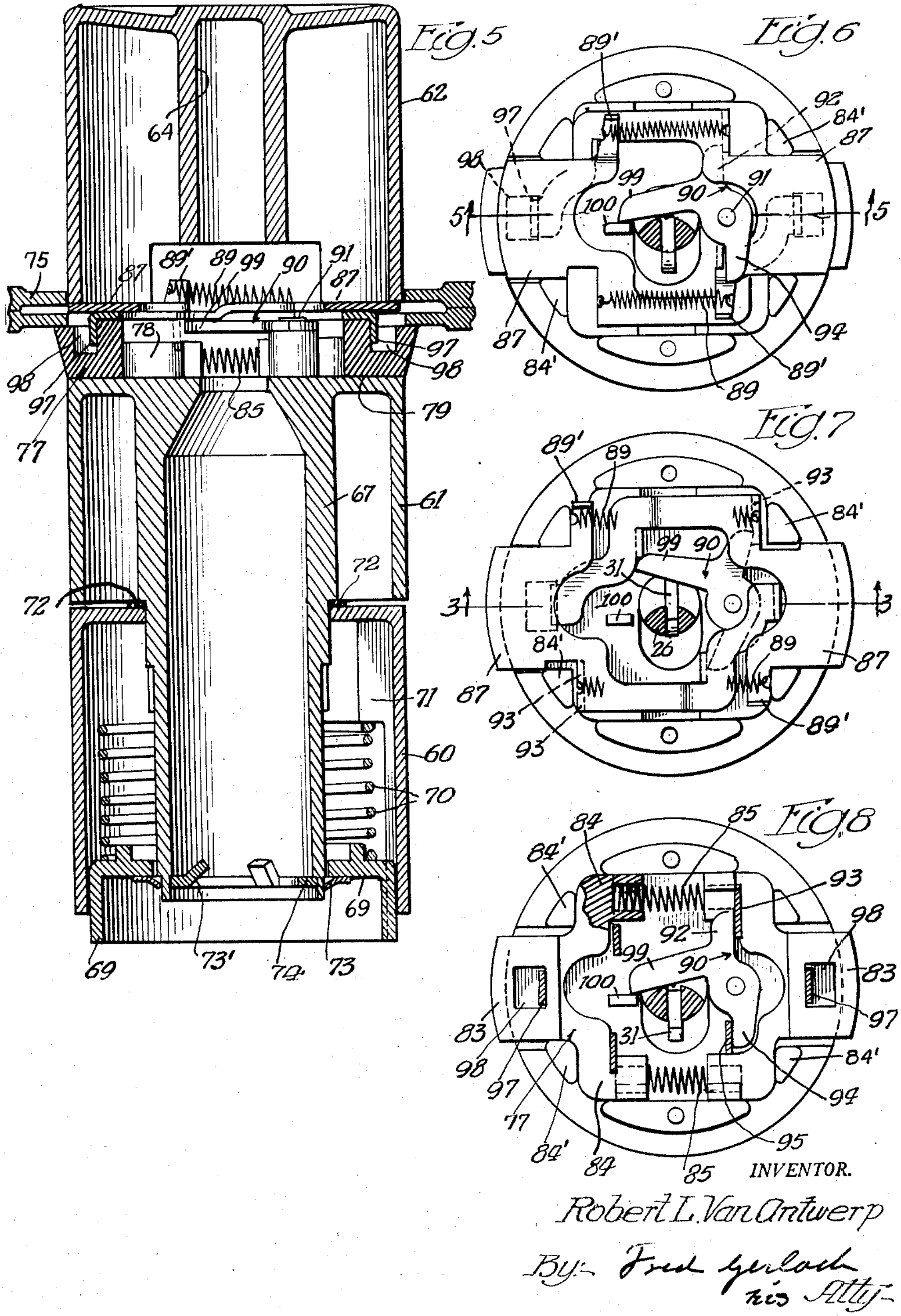
Fig. 5 is a vertical sectional view of the outer spindle taken on line 5—5 of Fig. 6, the outer spindle being detached from the inner spindle.
Fig. 6 is a plan view of the record-changing device on the intermediate section of the outer spindle, in its normal position for supporting a stack of records.
Fig. 7 is a similar view illustrating the record changer on the outer spindle actuated to drop a record onto the turntable.
Fig. 8 is a plan view of the slidable record-supporting detent on the outer spindle, in record-supporting position, the separating blades being omitted, parts being shown in section.
Figure 9:
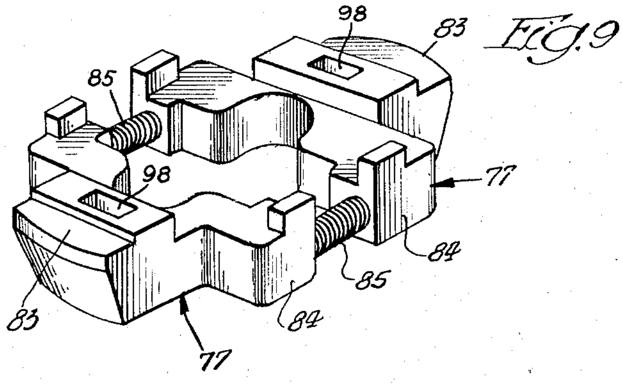
Fig. 9 is a perspective view of the slidable record-supporting detents on the outer spindle.
Figures 10, 11:
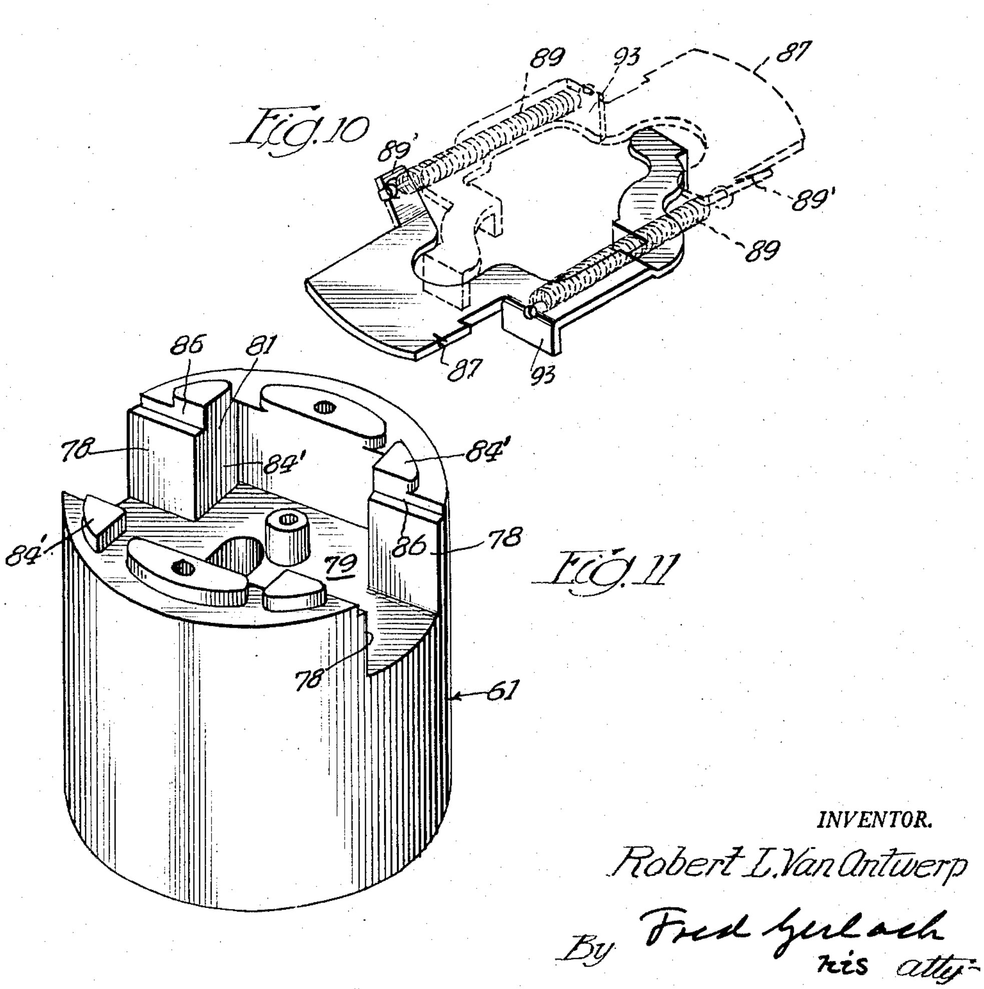
Fig. 10 is a perspective view of the separator blades of the changer mechanism on the outer spindle, one of the blades being shown in dotted lines.
Fig. 11 is a perspective view of the intermediate section of the outer spindle.

In the operation of the above-described adapter, when a stack of records with large center holes has been placed on the outer spindle, the detents 77 will normally project from the periphery of the outer spindle and support the stack above the turntable. The blades 87 will be retracted within the periphery of spindle section 62, as shown in Figs. 5 and 6. During the operation of the turntable, the lower spindle section 60 will be rotated with the turntable. When the record on the turntable has been reproduced, the control mechanism for the record-changing device on the inner spindle will be actuated to lift stem 44, plunger 37, spring 39 and lever 31, and move the upper end of lever 31 into position o engage the lever 90 carried by the outer spindle. During the upward movement of plunger 37, lever 31 will be arrested against upward movement by the lower end of notch 33 and pin 32, and cam 38 will swing lever 31 to cause its abutment 34 to engage lever 90 and move it into the position shown in Figs. 4 and 7. Arm 92 on lever 90 will engage depending tongue 93 on one of the blades 87, and arm 94 will engage depending tongue 95 on the other blade 87 and shift the ends of the blades outwardly so that they will project from the periphery of the outer spindle and pass between the lowermost record 76 and the lower of the superposed records. Tongues 97 on blades 87 will retract detents 77 against the force of springs 85 for releasing the lowermost record to drop onto the turntable or previously deposited records thereon. When the lever 31 is operated pivotally during the lowering of plunger 38, lever 90 will swing to its normal position as shown in Figs. 5 and 6. Arms 92 and 94 will be actuated to permit springs 89 to retract blades 87 and springs 85 to shift detents 77 outwardly to support the stack of records.

When it is desired to reproduce records with small spindle openings, the outer spindle and its record-changing mechanism may be removed as a unit from spindle 26. Records with small openings will be supported on the offset 28 of the inner spindle and lever 31 will be operable to remove the lowermost record from said offset for depositing it on the turntable.

The invention exemplifies an adapter or outer spindle for records having large spindle openings, provided with a record-changing device which consists of slidable and oppositely retractable members and blades which are operable from the record-changing device on the inner spindle. The detents 77 and blades 87 are oppositely slidable for effecting record changes, and actuating lever 90 is controlled by the record-changing device on the inner spindle. The detents 77 and the blades 87 are slidably mounted on the top wall of the intermediate section 61 of the outer spindle and between separate sections 61 and 62 and are conveniently accessable for repair and replacements when the cap section is removed. The slidable detents 77 are held in guides formed on the top wall of the intermediate section so that notches in the cap section for the detents are avoided. The construction exhibited is advantageous in fabrication and efficient in operation.

The invention is not to be understood as restricted to the details set forth, since these may be varied within the scope of the appended claim without departing from the spirit and scope of the invention.

Having thus described the invention what I claim as new and desire to secure by Letters Patent is:

An adapter designed for use with a phonograph having a rotatable turntable, and a non-rotatable spindle of relatively small diameter, having the upper end portion thereof laterally offset and embodying directly beneath its offset upper end portion an upwardly facing shoulder for supporting a stack of phonograph records having center holes of correspondingly small diameter, said spindle having mounted within it a lever having a radially shiftable head to push off the bottom record of a stock of records on the shoulder, said adapter comprising a top housing section in the form of a cylindrical cap for receiving and centering with respect to the portion of the spindle that is beneath the aforementioned shoulder a stack of records having large diameter center holes, said cap having an offset axial bore into which projects the laterally offset upper end portion of the spindle, a lower housing section in the form of a cylindrical tubular member of the same diameter as the top section, means for securing the lower section to the top section in end-to-end and coaxial relation, said lower section having a central bore through which extends the portion of the spindle below the aforementioned shoulder, the upper end of the said lower section being recessed to provide vertically aligned upper and lower pairs of diametrically opposite guideways, two oppositely disposed detent members slidably mounted within the lower guideways respectively and movable radially of the spindle between retracted positions wherein they are wholly contained within the cylindrical confines of the lower section and advanced positions wherein they protrude beyond the cylindrical confines of the top and lower sections and serve to support the lowermost record of the stack of records having large diameter center holes, each of said detent members having an open top socket in its upper portion, spring means interposed between said detent members and arranged to urge such members toward their advanced positions, two oppositely disposed blade members slidably mounted within the upper guideways respectively and movable radially of the spindle between retracted positions wherein they are wholly confined within the cylindrical confines of the lower section and advanced positions wherein they protrude beyond the confines of the top and lower sections and serve to support the penultimate lowermost record in the stack of records having large diameter center holes, each of said blade members overlying one of the detent members and being provided at the inner portion thereof with a relatively narrow inwardly extending extension the inner end portion of which overlies the other detent member and embodies at its outer extremity a downwardly bent tongue which fits within the socket in said other detent member, spring means connecting the blade members and serving to urge said blade members toward their retracted positions, said downwardly bent tongues and the aforementioned sockets in which the tongues fit forming together motion-transmitting connections whereby when the blade members are moved outwards into their advanced positions against the force of the second mentioned spring means the detent members are caused to move inwards into their retracted positions for record dropping purposes and when the blade members move inwards into their retracted positions the detent blades are caused to move outwards into their advanced positions, each of the two blade members being provided on the inner portion thereof with an integral depending lug, and a spider-like actuating member for controlling movement of the blade members between their advanced and their retracted positions, said actuating lever being mounted in the lower section for rocking movement about a vertical axis and having three substantially radially extending arms, one of said arms being engageable with, and subject to actuation by, said radially shiftable head of the lever within the spindle, and the other two arms being engageable with said depending lugs on the two blade members respectively.

References Cited in the file of this patent

UNITED STATES PATENTS

| | | |
|---|---|---|
| 2,510,455 | Alexandersson | June 15, 1950 |
| 2,549,246 | Schweiter | Apr. 17, 1951 |
| 2,634,135 | Carson | Apr. 7, 1953 |
| 2,651,523 | Dale | Sept. 8, 1953 |
| 2,666,647 | Dale | Jan. 19, 1954 |
| 2,666,648 | Dale | Jan. 19, 1954 |

FOREIGN PATENTS

| | | |
|---|---|---|
| 674,361 | Great Britain | June 25, 1952 |
| 1,073,502 | France | Sept. 7, 1954 |